(12) United States Patent
Shirane

(10) Patent No.: US 8,259,552 B2
(45) Date of Patent: Sep. 4, 2012

(54) OPTICAL PICKUP APPARATUS

(75) Inventor: Shigeharu Shirane, Kumagaya (JP)

(73) Assignee: Sanyo Electric Co., Ltd., Osaka (JP)

( * ) Notice: Subject to any disclaimer, the term of this patent is extended or adjusted under 35 U.S.C. 154(b) by 16 days.

(21) Appl. No.: 12/957,710

(22) Filed: Dec. 1, 2010

(65) Prior Publication Data
US 2011/0292782 A1 Dec. 1, 2011

(51) Int. Cl.
*G11B 7/00* (2006.01)
(52) U.S. Cl. ............................... 369/112.01; 369/112.03
(58) Field of Classification Search ............... 369/112.1, 369/112.01, 112.02, 44.23, 44.24, 109.1, 369/110.03, 112.16, 112.03, 112.05, 112.07
See application file for complete search history.

(56) References Cited

U.S. PATENT DOCUMENTS
8,064,315 B2 * 11/2011 Yasui ........................ 369/112.08
2007/0001112 A1 * 1/2007 Shimoguchi et al. ..... 250/237 R FOREIGN PATENT DOCUMENTS
JP 09-081942 3/1997
* cited by examiner

*Primary Examiner* — Nabil Hindi
(74) *Attorney, Agent, or Firm* — SoCal IP Law Group LLP; Steven C. Sereboff; John E. Gunther

(57) ABSTRACT

An optical pickup apparatus comprising a first laser unit including a first laser light source and a second laser unit including second and third laser light sources, being respectively disposed on a reflection (transmitting) surface side and a transmitting (reflection) surface side of a first beam splitter, laser lights of the first, second, and third wavelengths being guided onto a common optical path through the first beam splitter and guided to the respective sorts of optical recording mediums, each of the laser lights being divided by a diffraction grating disposed on the common optical path into a main beam and sub-beams, a second beam splitter being disposed on the upstream side of the diffraction grating on a return path of each of the laser lights, the laser lights through the second beam splitter being branched from the common optical path and being received by a photodetector.

5 Claims, 4 Drawing Sheets

OPTICAL PICKUP APPARATUS

CROSS-REFERENCE TO RELATED APPLICATION

This application claims the benefit of priority to Japanese Patent Application No. 2009-273212, filed Dec. 1, 2009, of which full contents are incorporated herein by reference.

BACKGROUND OF THE INVENTION

1. Field of the Invention

The present invention relates to an optical pickup apparatus that includes a first laser unit including a first laser light source configured to emit a laser light of a first wavelength and a second laser unit including second and third laser light sources configured to respectively emit laser lights of second and third wavelengths in which the first laser unit and the second laser unit are disposed on different light paths by a beam splitter, and laser lights of the first, second, and third wavelengths selectively emitted from the respective laser light sources of the first laser unit and the second laser unit are guided onto a common light path through the beam splitter and guided to the respective sorts of optical recording mediums suitable for the laser lights, and, more particularly, to an optical pickup apparatus that divides each of the laser lights of the first, second, and third wavelengths by a diffraction grating into a main beam as well as preceding and subsequent sub-beams at the front and the back of the main beam.

2. Description of the Related Art

In an optical pickup apparatus used for optically recording/reproducing signals with the use of laser lights to an optical recording medium such as optical discs including DVD (digital versatile disc) and CD (compact disc), there is known an optical pickup apparatus which is compatible with DVD and CD with different recording densities with a single optical pickup apparatus.

Such an optical pickup apparatus compatible with DVD and CD includes laser light sources emitting a laser light of 645 nm to 675 nm in a red wavelength band suitable for DVD and also emitting a laser light of 765 nm to 805 nm in an infrared wavelength band suitable for CD, and the laser light to be used is switched according to an optical disc.

The laser light source generally include a semiconductor laser of a laser diode, and a multi laser unit is increasingly employed in which the laser light sources emitting the laser lights of the respective wavelengths includes a single laser chip, or laser light sources include respective laser chips and are installed on the same semiconductor base so as to be incorporated in a single package.

Also, in the optical pickup apparatus compatible with DVD and CD, an objective lens in which an annular diffraction grating is formed on an incident face is used, and a quality of each of the laser lights applied to each optical disc is ensured by correcting spherical aberration with respect to each of the optical discs of DVD and CD by diffracting each of the laser lights having wavelengths suitable for each of the optical discs with this diffraction grating so as to correspond to DVD and CD by a single objective lens.

The optical pickup apparatus compatible with DVD and CD has its optical path simplified by employing the above-mentioned multi laser unit and the single objective lens.

On the other hand, there is present a BD compatible optical pickup apparatus compatible with a Blu-ray Disc (trademark) (abbreviated as BD) standard using a laser light of 395 nm to 420 nm (e.g., 405 nm) in a blue-violet wavelength band.

Such a BD compatible optical pickup apparatus includes DVD and CD optical systems along with a BD reproduction (and recording) optical system since a BD apparatus supports reproduction (and recording) of DVD and CD.

Therefore, since a plurality of parts of each optical system is incorporated in the BD compatible optical pickup apparatus, it is preferred that the DVD and CD optical systems are configured to be simplified or compactified.

By the way, in an optical pickup apparatus, three beams, i.e., 0th order diffraction light beam and ±1st order diffraction light beams are formed by diffracting a laser light generally emitted from a laser unit with a diffraction grating, and tracking control is performed so that the main beam of the 0th order diffraction light beam is followed by a signal track of an optical disc by using the three beams.

A differential push-pull method is often employed as the tracking control method using three beams, and a current mainstream differential push-pull method is a single-line arrangement differential push-pull method using three beams of a main beam and preceding and subsequent sub-beams arranged in a single line on the same signal track to generate a tracking error signal such that an amplitude of a favorable tracking error signal can be acquired without the effect of a difference in pitch of signal track between optical disc types (see Japanese Patent Application Laid-Open Publication No. 9-81942).

This single-line arrangement push-pull method is achieved by providing a diffraction grating with a phase shift area that generates a pi-radian phase shift in a predetermined portion of the laser light emitted from the laser light source and by generating a pi-radian phase shift in a light-receiving spot of each of preceding and subsequent sub-beams received by a photodetector.

To simplify an optical path in an optical pickup apparatus compatible with three-wavelength which is compatible with BD, DVD, and CD, it is conceivable to use a multi-laser unit compatible with three-wavelength which is capable of emitting three laser lights in the wavelength bands adapted to BD, DVD, and CD and to employ a single objective lens compatible with the wavelength bands of BD, DVD, and CD. However, in the case of the multi-laser unit compatible with three-wavelength, because of an inability to satisfy the optical performance required from a relationship between dispersion and an optical axis of the laser light source for the laser light of each of the wavelengths, or due to quality, reliability, or cost, the multi-laser unit compatible with three-wavelength is not currently employed.

Therefore, it is practical that the optical pickup apparatus compatible with the three-wavelength comprises a two-wavelength laser unit compatible with DVD and CD and a BD-dedicated laser unit compatible with BD.

It is an object of the present invention to provide an optical pickup apparatus that achieves simplification of optical systems when one multi-laser unit of at least two laser units is used.

SUMMARY OF THE INVENTION

An optical pickup apparatus according to an aspect of the present invention, comprises: a first laser unit including a first laser light source configured to emit a laser light of a first wavelength; and a second laser unit including second and third laser light sources configured to respectively emit laser lights of second and third wavelengths different from the first wavelength and different from each other, the first laser unit and the second laser unit being respectively disposed on a reflection surface side and a transmitting surface side of a first beam splitter, or, in reverse, on the transmitting surface side and the reflection surface side of the beam splitter, laser lights of the first, second, and third wavelengths, which are selectively emitted from the respective laser light sources of the first laser unit and the second laser unit, being guided onto a common optical path through the first beam splitter and guided to the respective sorts of optical recording mediums compatible with the laser lights, a diffraction grating being disposed on the common optical path, each of the laser lights of the first, second, and third wavelengths being divided by the diffraction grating into a main beam as well as preceding and subsequent sub-beams at the front and the back of the main beam, a second beam splitter being disposed on the upstream side of the diffraction grating, which is disposed on the common optical path, on a return path of each of the laser lights reflected and returned by the optical recording medium, each of the laser lights of the first, second, and third wavelengths returned from the optical recording medium through the second beam splitter being branched from the optical path on which the diffraction grating disposed and being received by a photodetector.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
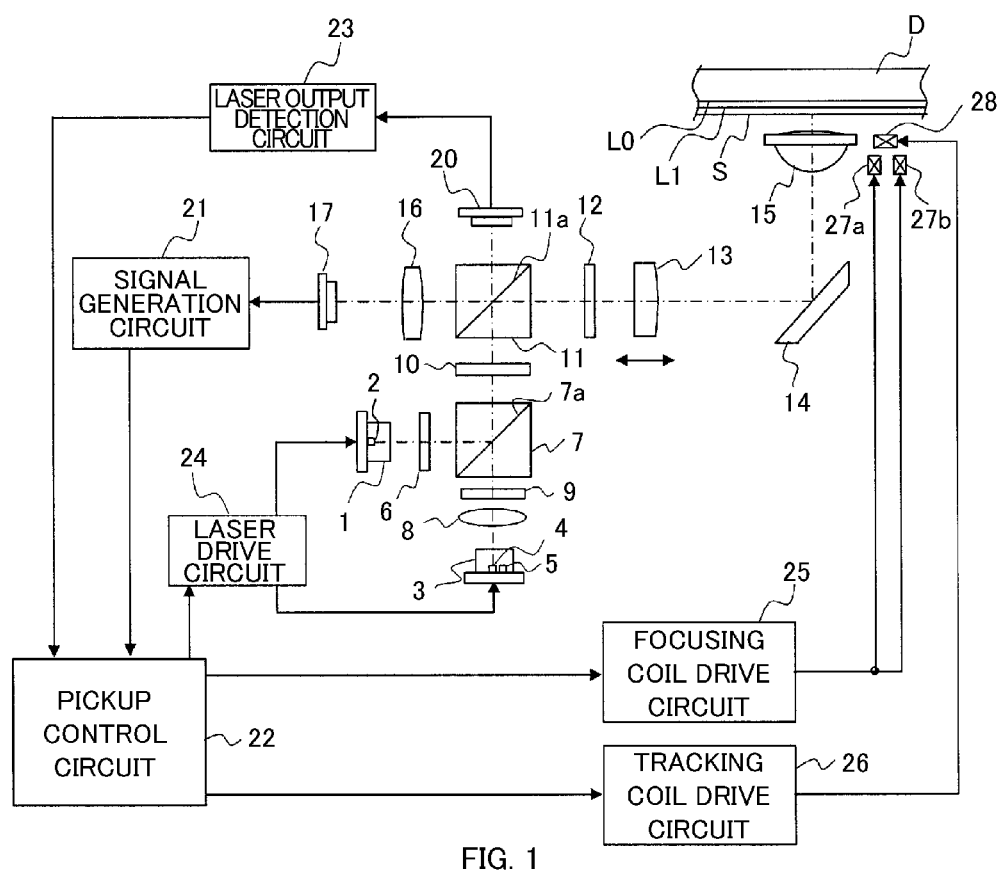
FIG. 1 is an explanatory diagram illustrating an example of an optical system arrangement and circuit blocks of an optical pickup apparatus according to an embodiment of the present invention.

At least the following details will become apparent from descriptions of this specification and of the accompanying drawings.

In an optical pickup apparatus according to the present embodiment, a laser light of a first wavelength emitted from a first laser unit, and laser lights of second and third wavelengths emitted from a second laser unit arranged on different light paths can be diffracted with a single diffraction grating, and the laser lights of the first, second, and third wavelengths returned from an optical recording medium can be received with a single photodetector. Therefore, an optical system can be simplified even in a configuration using the first laser unit and the second laser unit, and the optical pickup apparatus having an efficient optical layout can be provided.

In this case, by disposing the diffraction grating between a first beam splitter and a second beam splitter, a laser light on the return path toward the photodetector can be prevented from passing through the diffraction grating and being adversely affected by the diffraction grating.

Further, in the optical pickup apparatus according to the present embodiment, an optical axis of one of the laser lights of the second and third wavelengths emitted from the second laser unit is made to coincide with an optical axis of the laser light of the first wavelength emitted from the first laser unit. Therefore, a main beam of the laser light of the second laser unit and a main beam of the laser light of the first laser unit, the both optical axes of which laser lights are made to coincide with each other, can be received by a common main light-receiving area, and a first sub-light-receiving area configured to receive the preceding and subsequent sub-beams of the laser light of the first laser unit and a second sub-light-receiving area configured to receive the preceding and subsequent sub-beams of the laser light of the second laser unit, the both optical axes of which laser lights are made to coincide with each other, are disposed across the common main light-receiving area in a separate manner on the same straight line, and therefore, an efficient layout can be achieved within a narrow range for the light-receiving areas respectively receiving the main beam as well as the preceding and subsequent sub-beams of the laser lights of the second laser unit, and the light-receiving areas respectively receiving the main beam as well as the preceding and subsequent sub-beams of the laser lights of the first laser unit, the both optical axes of which laser lights are made to coincide with each other, without disposing an optical element that bends an optical axis.

Also, in the optical pickup apparatus according to the present embodiment, a polarization direction of the laser light of the first wavelength emitted from the first laser unit, and a polarization direction of each of the laser lights of the second and third wavelengths emitted from the second laser unit, are set to the same on the common optical path, and a quarter-wave plate is disposed on the common optical path. Therefore, each of the laser lights of the first, second, and third wavelengths can be applied to an optical recording medium with substantially circular polarization, and especially, when the second beam splitter includes a polarization beam splitter and the quarter-wave plate is disposed on the downstream side of the second beam splitter on a outward path along which the laser light travels toward the optical recording medium, each of the laser lights of the first, second, and third wavelengths can be efficiently guided to the photodetector by the second beam splitter.

First Embodiment

FIG. 1 is an explanatory diagram illustrating an example of an optical system arrangement and circuit blocks of an optical pickup apparatus according to the present embodiment.

The optical pickup apparatus shown in FIG. 1 is configured to be compatible with Blu-ray Disc (BD) as well as DVD and CD.

A first laser unit 1 includes a laser diode including a first laser light source 2 that is a laser chip emitting a laser light of a first wavelength of 395 nm to 420 nm in a blue-violet (blue) wavelength band, for example, 405 nm, suitable for BD.

A second laser unit 3 includes a laser diode including a second laser light source 4 that is a laser chip emitting a laser light of a second wavelength of 645 nm to 675 nm in the red wavelength band, for example, 650 nm, suitable for DVD, and a third laser light source 5 that is a laser chip emitting a laser light of a third wavelength of 765 nm to 805 nm in the infrared wavelength band, for example, 785 nm, suitable for CD on the same semiconductor substrate, and includes a multi-laser unit so as to emit laser lights of two wavelengths adapted to the CD recording/reproducing and the DVD recording/reproducing with a single laser unit.

The laser light of the first wavelength emitted from the first laser light source 2 of the first laser unit 1 is adjusted its polarization direction by a half-wave plate 6 and is supplied to a dichroic prism 7 in the reflection direction of a filter film 7a of the dichroic prism 7.

On the other hand, the laser lights of the second wavelength and the third wavelength respectively emitted from the second laser light source 4 and the third laser light source 5 of the second laser unit 3 are adjusted their spread angles by a coupling lens 8, then adjusted their polarization directions by a half-wave plate 9, and supplied to the dichroic prism 7 in the transmission direction of the filter film 7a of the dichroic prism 7.

This dichroic prism 7 plays a role in arranging the first laser unit 1 and the second laser unit 3 in different optical paths, and the filter film 7a of the dichroic prism 7 is subjected to reflection/transmission coating having wavelength selectivities that ensure a transmissivity of 95% or more for laser lights of 650 nm and 785 nm and ensure a transmissivity of less than 5% for a laser light of 405 nm, that is, a reflectivity of 95% or more.

Therefore, the laser light of the first wavelength emitted from the first laser unit 1 is reflected by the filter film 7a of the dichroic prism 7 and, in contrast, each of the laser lights of the second wavelength and the third wavelength emitted from the second laser unit 3 is transmitted through the filter film 7a of the dichroic prism 7 and led out from the dichroic prism 7.

Each of the laser lights of the first wavelength, the second wavelength, and the third wavelength led out from the dichroic prism 7 is diffracted by a diffraction grating 10 so as to form preceding and subsequent sub-beams used for the tracking control, and is then incident on a polarization beam splitter 11.

Here, each of the laser lights of the first wavelength, the second wavelength, and the third wavelength is set to be s-polarized relative to a polarization filter film 11a of the polarization beam splitter 11 by the half-wave plate 6 and the half-wave plate 9, and is set to be reflected by the polarization filter film 11a. The laser light emitted from the first laser unit 1 and each of the laser lights emitted from the second laser unit 3 can also be set to be s-polarized relative to the polarization filter film 11a of the polarization beam splitter 11 by setting a rotating direction of the first laser unit 1 and the second laser unit 3, and in this case, the half-wave plate 6 and the half-wave plate 9 can be eliminated.

The polarization beam splitter 11 allows a part of the laser light to pass therethrough and to be guided to a front monitor light-receiving detector 20 by the film characteristics of the polarization filter film 11a and a polarization component of the incident laser light (by allowing the laser light to slightly containing a p-polarized component relative to the polarization filter film 11a of the polarization beam splitter 11), and also allows the remaining laser light which does not pass therethrough to be reflected and guided to a main optical path.

The front monitor light-receiving detector 20 generates a monitor output corresponding to an amount of the received laser light, and the monitor output is detected by a laser output detection circuit 23. A laser drive circuit 24 driving the first laser unit 1 and the second laser unit 3 is controlled by a pickup control circuit 22 such that a monitor output detected by the laser output detection circuit 23 is controlled to a predetermined constant amount, and as a result, the laser light emitted from the first laser unit 1 and each of the laser lights emitted from the second laser unit 3 are retained at a predetermined light amount depending on the monitor output.

Each of the laser lights reflected by the polarization filter film 11a of the polarization beam splitter 11 passes through a quarter-wave plate 12 and a collimator lens 13, is reflected by a reflection mirror 14 to refract the optical axis orthogonally, and is incident on an objective lens 15.

Here, by adding a diffraction effect of a diffraction ring zone formed by dividing into a plurality of areas around the optical axis on the side of an incident surface of laser lights to the refraction effect of a lens spherical surface, the objective lens 15 is compatible with three-wavelength and functions as NA adapted to each of the compatible wavelengths of BD, DVD, and CD.

The laser light of the first wavelength emitted from the first laser light source 2 of the first laser unit 1 and the laser light of the second wavelength and the laser light of the third wavelength emitted from the second laser light source 4 and the third laser light source 5, respectively, of the second laser unit 3, by the above optical system, are allowed to be incident on the single objective lens 15, and the laser lights are converged by the objective lens 15 and applied to a signal layer L0 or L1 of a disc D.

The collimator lens 13 can be driven in the direction of the optical axis of the laser light and the spherical aberration of the laser light applied to the signal layer of the optical disc D is corrected by displacing the collimator lens 13 to adjust the spread angles of the laser lights incident on the objective lens 15.

Moreover, even if each of the first, second, and third laser lights applied to the signal layer of the optical disc D is not formed into completely circular polarized light by the quarter-wave plate 12 due to a difference in wavelength, a necessary circular polarized light ellipticity is ensured.

The laser light modulated and reflected by the signal layer of the disc D returns to the objective lens 15, returns through the optical path having been traveled, and reaches the polarization beam splitter 11.

Since the laser light returned to the polarization beam splitter 11 passes through the quarter-wave plate 12 on the outward path to and the return path from the disc D, the linear polarization direction of the laser light returned to the polarization beam splitter 11 has been rotated about 90 degrees. Therefore, the laser light which was the s-polarization relative to the polarization filter film 11a of the polarization beam splitter 11 on the outward path to the optical disc D becomes p-polarization and is incident on the polarization filter film 11a. Therefore, the laser light returned to the polarization beam splitter 11 is substantially completely transmitted through the polarization filter film 11a.

The laser light transmitted through the polarization filter film 11a is provided with an astigmatic component for a focus error by a sensor lens 16 such as an anamorphic lens, a cylinder lens, and a toric lens, and the laser light is subjected to focal length adjustment and guided to a photodetector 17.

Figure 2:
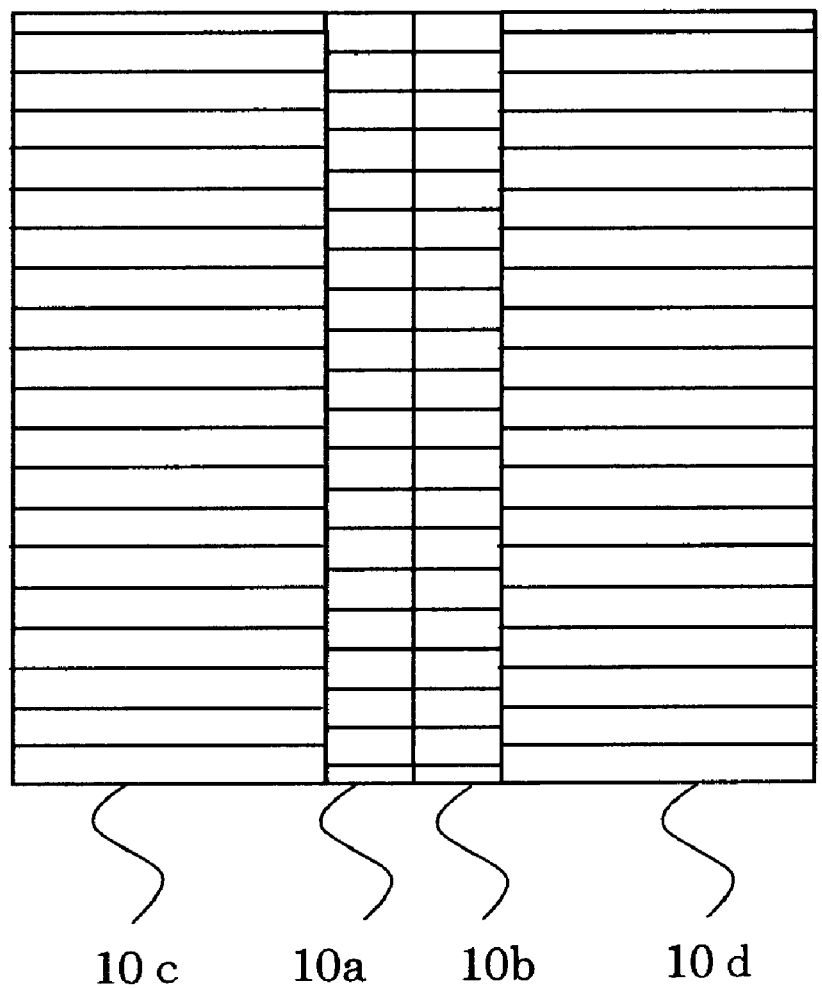
FIG. 2 is an explanatory diagram schematically illustrating a configuration of a plane of a diffraction grating 10.

FIG. 2 is an explanatory diagram schematically illustrating a configuration of a flat surface of the diffraction grating 10. As shown in FIG. 2, the diffraction grating 10 is divided into four parts in accordance with the direction of the signal track of the optical discs, and outer regions 10c, 10d on the both sides interposing center regions 10a, 10b divided into two parts therebetween are regions for adding a pi radian phase shift to the laser lights that pass therethrough with each other. The center regions 10a, 10b of the diffraction grating 10 are regions for adding a phase shift such that the adjacent regions of the diffraction grating 10 has a phase difference equal to or less than the pi radian phase difference between each outer region 10c, 10d. For example, the diffraction grating 10 has a phase difference of pi/2-radian between one outer region 10c and the adjacent center region 10a, and a phase difference of pi/2-radian between the other outer region 10d and the adjacent center region 10b, and a phase difference between the center regions 10a and 10b is a phase difference of pi radian.

The grating shape of the diffraction grating 10 is a simple convex-concave shape, such as with grooves with a predetermined pitch formed on white sheet glass, and the grating height is suitably set for each of the laser lights of the first wavelength for BD, the second wavelength for DVD, and the third wavelength for CD such that a rate of 0th order diffraction light and ±1st order diffraction light satisfies both the signal reproduction or signal recording characteristics and the tracking servo characteristics in the laser lights of each of the wavelengths. When the material that makes up the diffraction grating 10 is B270 type optical crown glass, if the grating height of the diffraction grating 10 is set to about 0.15 μm, a rate of 0th order diffraction light and ±1st order diffraction light of the laser lights of each of the wavelengths becomes 5:1 for the BD laser light of the first wavelength, 16:1 for the DVD laser light of the second wavelength, and 23:1 for the CD laser light of the third wavelength, which are suitably set for the laser lights of each of the wavelengths.

One of the laser lights of the first wavelength, the second wavelength, and the third wavelength is selectively emitted in accordance with the optical disc subjected to recording or reproduction; the emitted laser light is diffracted by the same diffraction grating 10 in each case of the laser lights of the first wavelength, the second wavelength, and the third wavelength to form three beams, i.e., the main beam of the 0th order diffraction light and the forward and backward sub-beams of the ±1st order diffraction light; and the three beams are arranged in a line on the same signal track and applied to the optical disc.

The three beams applied to the optical disc are received by the photodetector 17.

Figure 3:
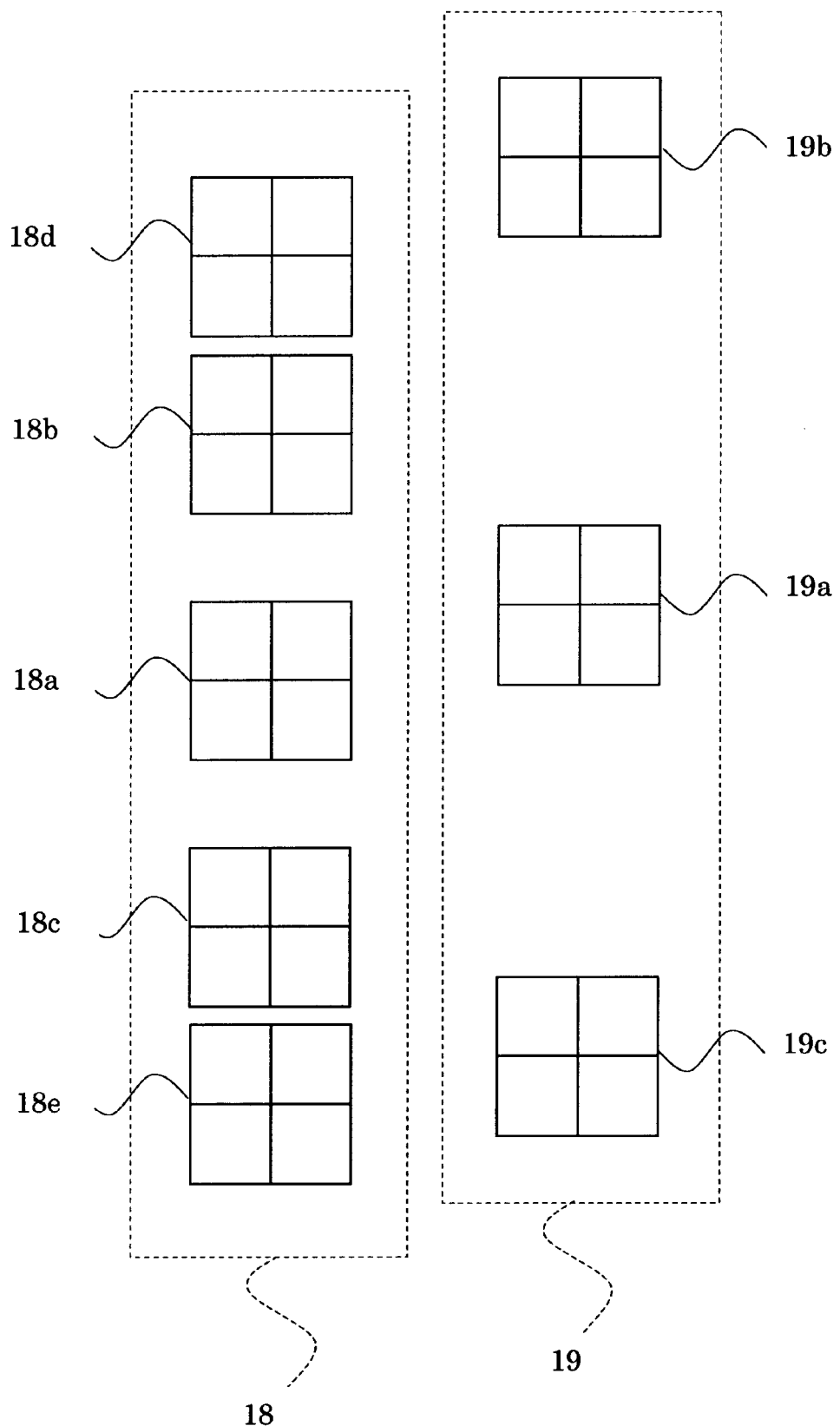
FIG. 3 is an explanatory diagram for explaining an arrangement of each of the light-receiving areas of a photodetector.
Figure 4:
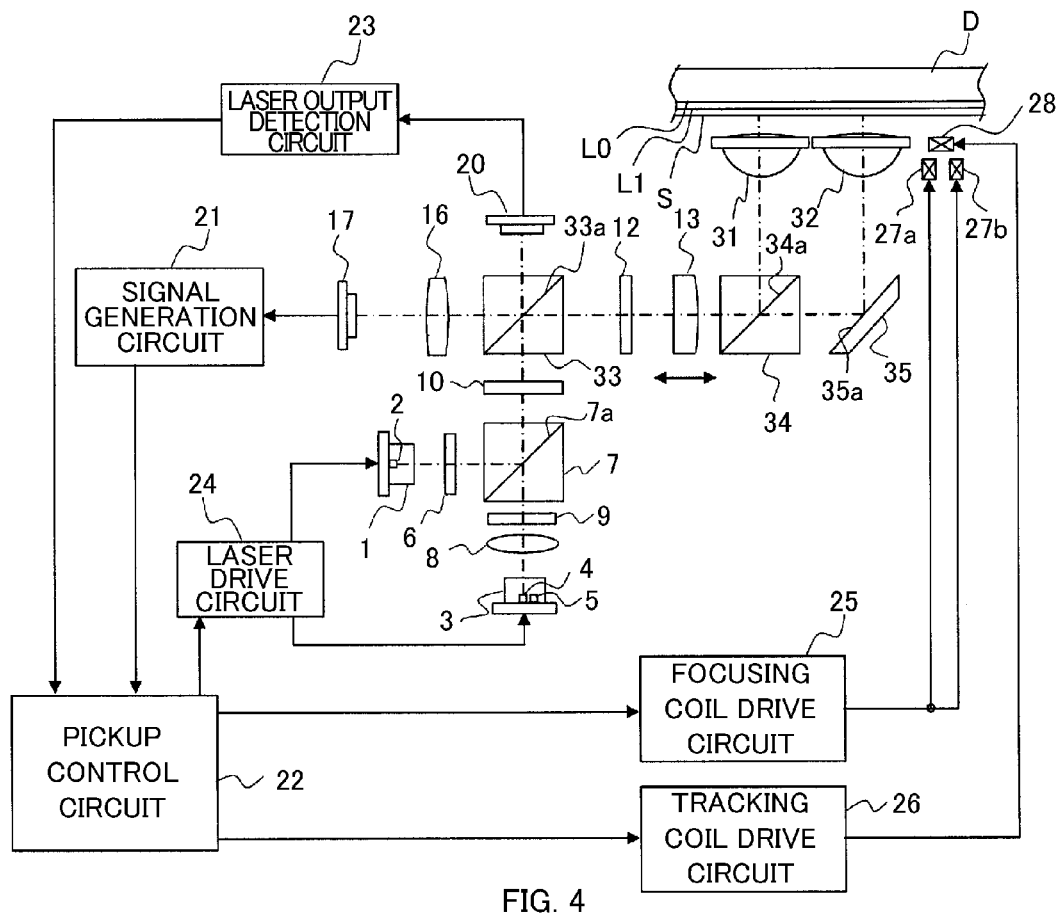
FIG. 4 is an explanatory diagram illustrating another example of an optical system arrangement and circuit blocks of an optical pickup apparatus according to an embodiment of the present invention.

FIG. 3 is an explanatory diagram illustrating a light-receiving surface of the photodetector 17. As shown in FIG. 3, the photodetector 17 is configured so that a first light-receiving unit 18 having five light-receiving areas arranged in a line and a second light-receiving unit 19 having three light-receiving area arranged in a line are arranged in two substantially parallel rows, and each of all the light-receiving areas that makes up the first light-receiving unit 18 and the second light-receiving unit 19 include a four-divided light-receiving area, which is divided into four parts by partition lines perpendicular to each other.

The first light-receiving unit 18 which is a row including five light-receiving areas includes a main light-receiving area 18a at the center, first forward and backward sub-light-receiving areas 18b and 18c arranged adjacently to the main light-receiving area 18a with the main light-receiving area 18a interposed therebetween, and second forward and backward sub-light-receiving areas 18d and 18e arranged so as to interpose the first forward and backward sub-light-receiving areas 18b and 18c therebetween.

Here, the optical axes of the first laser light source 2 of the first laser unit 1 and the second laser light source 4 of the second laser unit 3 are made to coincide with each other. Therefore, the main light-receiving area 18a receives the main beam of a first laser light emitted from the first laser light source 2 of the first laser unit 1 and the main beam of a second laser light emitted from the second laser light source 4 of the second laser unit 3.

Also, since the single diffraction grating 10 diffracts the laser lights having different wavelengths, the diffraction angles of the diffraction lights of order other than 0th order of the first laser light and the second laser light are different, and the diffraction angle is greater when the wavelength of the laser light is longer in the case of the diffraction light of the same order. Therefore, when the diffraction pitch of the diffraction grating 10 is set with consideration given to the wavelength of the laser light, the first forward and backward sub-light-receiving areas 18b and 18c respectively receive the forward and backward sub-beams of the first laser light, and the second forward and backward sub-light-receiving areas 18d and 18e respectively receive the forward and backward sub-beams of the second laser light.

A distance between the main light-receiving area 18a and the first forward and backward sub-light-receiving areas 18b and 18c corresponds to an interval between each of the light spots of the three beams applied onto the signal layer of the optical disc for BD, and a distance between the main light-receiving area 18a and the second forward and backward sub-light-receiving areas 18d and 18e corresponds to a interval between each of the light spots of the three beams applied onto the signal layer of the optical disc for DVD.

On the other hand, the second light-receiving unit 19 that is a row including three light receiving areas includes a second main light-receiving area 19a at the center and third forward and backward sub-light-receiving areas 19b and 19c arranged on the both sides with the main light-receiving area 19a interposed therebetween. The main light-receiving area 19a receives the main beam of a third laser light emitted from the third laser light source 5 of the second laser unit 3, and the third forward and backward sub-light-receiving areas 19b and 19c respectively receive the forward and backward sub-beams of the third laser light.

A distance between the main light-receiving area 19a and the third forward and backward sub-light-receiving areas 19b and 19c corresponds to an interval between each of the light spots of the three beams applied onto the signal layer of the optical disc for CD.

The second laser light source 4 and the third laser light source 5 of the second laser unit 3 are disposed along the direction substantially corresponding to the radial direction of the optical disc perpendicular to the signal track on the signal layer of the optical disc D. Therefore, the arrangement direction of each of the light-receiving areas of the first light-receiving unit 18 and the arrangement direction of each of the light-receiving areas of the second light-receiving unit 19 are substantially in parallel with each other, and each of the light-receiving areas of the first light-receiving unit 18 and each of the light-receiving areas of the second light-receiving unit 19 are disposed at a moderate distance without overlapping or being located too close.

When the reproduction or recording of BD is performed, the first laser light source 2 of the first laser unit 1 emits light. Therefore, the laser light for BD of the first wavelength emitted from the first laser light source 2 is reflected by the filter film 7a of the dichroic prism 7, formed into three beams by the diffraction grating 10, reflected by the filter film 11a of the polarization beam splitter 11 to travel through the outward path, focused by the objective lens 15 via the optical elements, and applied to the signal layer of the optical disc. In this case, the three beams converged onto the signal layer of the optical disc are applied to the same signal track.

The laser light reflected by the optical disc and returned to the objective lens 15 travels in the direction opposite to the outward path, is incident on the polarization beam splitter 11 with the direction of the linear polarization rotated about 90 degrees from the outward path by the quarter-wave plate 12, is substantially completely transmitted through the polarization filter film 11a, and arrives at the photodetector 17 via the servo lens 16.

In the laser light for BD arriving at the photodetector 17, the main beam is received by the main light-receiving area 18a, and the forward and backward sub-beams respectively located at the front and the back of the main beam are received by the first forward and backward sub-light-receiving areas 18b and 18c, respectively. Each of the main light-receiving area 18a and the forward and backward sub-light-receiving areas 18b and 18c is configured so that one light-receiving area is divided into four segments by two partition lines perpendicular to each other, and a light-receiving spot including a focus error component and a tracking error component reflecting a state of the laser light for BD applied to the optical disc is received in a manner effective for the orientation of the partition lines of each of the light-receiving areas.

Therefore, each of the light-receiving outputs obtained from each segment that makes up the first main light-receiving area 18a and the first forward and backward sub-light-receiving areas 18b and 18c is supplied to a signal generation circuit 21, an operation is carried out by the signal generation circuit 21 based on a predetermined operational expression to obtain an information data signal (RF signal), a focus error signal and a tracking error signal, or a tilt error signal at the time of recording/reproduction of BD.

On the other hand, when the reproduction or recording of DVD is performed, the second laser light source 4 of the second laser unit 3 emits light. Therefore, the laser light for DVD of the second wavelength emitted from the second laser light source 4 is transmitted through the filter film 7a of the dichroic prism 7, formed into three beams by the diffraction grating 10, reflected by the filter film 11a of the polarization beam splitter 11 to travel through the outward path, focused by the objective lens 15 via the optical elements, and applied to the signal layer of the optical disc. In this case, the three beams converged onto the signal layer of the optical disc are applied to the same signal track as is the case with BD.

The laser light reflected by the optical disc and returned to the objective lens 15 travels in the direction opposite to the outward path, is incident on the polarization beam splitter 11 with the direction of the linear polarization rotated about 90 degrees from the outward path by the quarter-wave plate 12, is substantially completely transmitted through the polarization filter film 11a, and arrives at the photodetector 17 via the servo lens 16.

In the DVD laser light arriving at the photodetector 17, the main beam is received by the main light-receiving area 18a, and the forward and backward sub-beams respectively located at the front and the back of the main beam are received by the second forward and backward sub-light-receiving areas 18d and 18e, respectively. Each of the main light-receiving area 18a and the forward and backward sub-light-receiving areas 18d and 18e is configured so that one light-receiving area is divided into four segments by two partition lines perpendicular to each other, and a light-receiving spot including a focus error component and a tracking error component reflecting a state of the laser light for DVD applied to the optical disc is received in a manner effective for the orientation of the partition lines of each of the light-receiving areas.

Therefore, each of the light-receiving outputs obtained from each segment that makes up the first main light-receiving area 18a and the second forward and backward sub-light-receiving areas 18d and 18e is supplied to the signal generation circuit 21, and an operation is curried out by the signal generation circuit 21 based on a predetermined operational expression to obtain an information data signal (RF signal), a focus error signal and a tracking error signal, or a tilt error signal at the time of recording/reproduction of DVD.

Also, when the reproduction or recording of CD is performed, the third laser light source 5 of the second laser unit 3 emits light. Therefore, the laser light for CD of the third wavelength emitted from the third laser light source 5 is transmitted through the filter film 7a of the dichroic prism 7, formed into three beams by the diffraction grating 10, reflected by the filter film 11a of the polarization beam splitter 11 to travel through the outward path, focused by the objective lens 15 via the optical elements, and applied to the signal layer of the optical disc. In this case, the three beams converged onto the signal layer of the optical disc are applied to the same signal track as is the case with other discs.

The laser light reflected by the optical disc and returned to the objective lens 15 travels in the direction opposite to the outward path, is incident on the polarization beam splitter 11 with the direction of the linear polarization rotated about 90 degrees from the outward path by the quarter-wave plate 12, is substantially completely transmitted through the polarization filter film 11a, and arrives at the photodetector 17 via the servo lens 16.

In the laser light for CD arriving at the photodetector 17, the main beam is received by the second main light-receiving area 19a, and the forward and backward sub-beams respectively located at the front and the back of the main beam are received by the third forward and backward sub-light-receiving areas 19b and 19c, respectively. Each of the main light-receiving area 19a and the forward and backward sub-light-receiving areas 19b and 19c is configured so that one light-receiving area is divided into four segments by two partition lines perpendicular to each other, and a light-receiving spot including a focus error component and a tracking error component reflecting a state of the laser light for CD applied to the optical disc is received in a manner effective for the orientation of the partition lines of each of the light-receiving areas.

Therefore, each of the light-receiving outputs obtained from each segment that makes up the second main light-receiving area 19a and the third forward and backward sub-light-receiving areas 19b and 19c is supplied to the signal generation circuit 21, and an operation is curried out by the signal generation circuit 21 based on a predetermined operational expression to obtain an information data signal (RF signal), a focus error signal and a tracking error signal, or a tilt error signal at the time of recording/reproduction of CD.

Even when any of the laser light having a wavelength suitable for BD from the first laser light source 2, the laser light having a wavelength suitable for DVD from the second laser light source 4, or the laser light having a wavelength suitable for CD from the third laser light source 5 is emitted, the RF signal, the focus error signal, the tracking error signal, and the radial tilt error signal generated by the signal generation circuit 21 are supplied to a pickup control circuit 22, and the pickup control circuit 22 generates a focus control signal that controls a focusing coil drive circuit 25 based on the focus error signal and the radial tilt error signal and generates a tracking control signal that control a tracking coil drive circuit 26 based on the tracking error signal.

Here, the objective lens 15 is attached to a lens holder (not shown) that makes up a movable unit of an objective lens driving device (not shown), and for example, a pair of focusing coils 27a, 27b and a tracking coil 28 are fixed in the lens holder. The pair of the focusing coils 27a, 27b is arranged in the lens holder along the radial direction of the optical disc D, and the objective lens 15 is displaced in the focus direction by equal parts of the degrees of respective focus control signals supplied to the focusing coils 27a, 27b and is tilted in the radial tilt direction by a difference between the degrees of respective focus control signals.

The focusing coils 27a, 27b are supplied with respective focus control signals from the focusing coil drive circuit 25, and the tracking coil 28 is supplied with the tracking control signals from the tracking coil drive circuit 26.

Therefore, in the optical pickup apparatus described in the present embodiment, the laser light having a wavelength suitable for BD from the first laser light source 2, the laser light having a wavelength suitable for DVD from the second laser light source 4, or the laser light having a wavelength suitable for CD from the third laser light source 5 is allowed to be focused on the signal layer of the optical disc D of BD, DVD, or CD by driving the objective lens 15 through the focus control, the tracking control, and/or the tilt control, and applied so as to be followed by a predetermined signal track.

In the above-mentioned embodiment, although the optical axes of the first laser light source 2 of the first laser unit 1 and the second laser light source 4 of the second laser unit 3 are made to coincide with each other, the laser light for BD and the laser light for DVD may be received by a common first main light-receiving area 18a, and the first forward and backward sub-light-receiving areas 18b and 18c of the sub-light-receiving area for BD are arranged along with the second forward and backward sub-light-receiving areas 18d and 18e of the sub-light-receiving area for DVD in a line, when the optical axes of the first laser light source 2 of the first laser unit 1 and the third laser light source 5 of the second laser unit 3 are made coincide with each other, the laser light for BD and the laser light for CD may be received by the common first main light-receiving area 18a; the forward and backward sub-light-receiving areas for BD and the forward and backward sub-light-receiving areas for CD may be arranged in a line as a first light-receiving unit; and the main light-receiving area for DVD and the forward and backward sub-light-receiving areas for DVD may be arranged as a second light receiving unit substantially in parallel with the first light-receiving unit.

Second Embodiment

In the above-mentioned first embodiment, although it is configured to use a three-wavelength compatible lens for the objective lens 15, in the second embodiment, it is configured to use two objective lenses, which are a first objective lens 31 dedicated to BD and a second objective lens 32 compatible with two wavelengths for DVD and CD. The second objective lens 32 has a diffraction ring zone formed on an incident surface and functions as NA adapted to each of the compatible wavelengths of DVD and CD.

Also, a semi-transmissive mirror is used for a second beam splitter 33. If there is an allowance in the laser light amount of the laser lights which are generated from the first laser light source of the first laser unit and the second laser light source and the third laser light source of the second laser unit, respectively, the semi-transmissive mirror can be employed as the second beam splitter 33 to achieve cost reduction.

The optical components and circuit blocks equivalent to those in the first embodiment are designated by the same reference numerals.

In the characteristics of the semi-transmissive mirror of the second beam splitter 33, a reflective laser light amount and a transmitted laser light amount are not necessarily set to the same amount and are set in consideration of the laser light amount arriving at the optical disc and the laser light amount received into a photodetector.

If the semi-transmissive mirror is used for the second beam splitter 33, the quarter-wave plate 12 is eliminated.

Also, if the semi-transmissive mirror is used for the second beam splitter 33, a dichroic prism having wavelength dependence in a filter film may be used for the first beam splitter 7 as in the first embodiment, and also, a polarization beam splitter can be used to set the linear polarization directions of the first laser light from the first laser unit and the second and third laser lights from the second laser unit incident on this polarization beam splitter to s-polarization and p-polarization, or, in reverse, p-polarization and s-polarization, respectively.

When the polarization beam splitter is used, return light to the laser unit including the laser light source emitting the laser light is suppressed due to a relationship between the polarization dependency of the filter film of the polarization beam splitter and the linear polarization direction of the return light, and the quality deterioration is prevented in the laser light emitted from the laser light source.

When it is configured to use the two objective lenses 31, 32 and use the semi-transmissive mirror for the second beam splitter 33, raising mirrors 34 and 35 are disposed that have reflection surfaces immediately below the optical axes of the objective lenses 31 and 32, respectively.

The raising mirror 34 on the upstream side of the outward path is a prism type and includes a dichroic filter film 34a having the wavelength dependency formed as the reflection surface, and the raising mirror 35 on the downstream side of the outward path is a flat plate type and includes a total reflection mirror film 35a formed as the reflection surface. Therefore, the first laser light of the BD wavelength is reflected by the filter film 34a of the raising mirror 34 and incident on the first objective lens 31, and the second laser light of the DVD wavelength and the third laser light of the CD wavelength are transmitted through the filter film 34a of the raising mirror 34, reflected by the total reflection mirror film 35a of the raising mirror 35, and incident on the second objective lens 32.

With such an optical system, the laser light of the first wavelength emitted from the first laser light source 2 of the first laser unit 1 is incident on the first objective lens 31, converged by the first objective lens 31, and applied to the disc D. On the other hand, the laser light of the second wavelength and the laser light of the third wavelength respectively emitted from the second laser light source 4 and the third laser light source 5 of the second laser unit 3 are incident on the second objective lens 32, converged by the second objective lens 32, and applied to the signal layer L0 or L1 of the disc D.

The laser light of the first wavelength modulated and reflected by the signal layer of the disc D returns to the first objective lens 31 and returns to the second beam splitter 33 through the optical path having been traveled, and the laser light transmitted through the filter film 33a of the second beam splitter 33 is received by the photodetector 17.

Similarly, the laser light of the second or third wavelength modulated and reflected by the signal layer of the disc D returns to the second objective lens 32 and returns to the second beam splitter 33 through the optical path having been traveled, and the laser light transmitted through the filter film 33a of the second beam splitter 33 is received by the photodetector 17.

Even in the above-mentioned configuration, the positional relationship of each of the laser light sources of the first laser unit 1 and the second laser unit 3 and the positional relationship of each of the light-receiving areas of the photodetector 17 are same as those in the first embodiment, the optical system is made up such that an optical axis of one of the laser lights of the second and third wavelengths emitted from the second laser unit 3 is made to coincide with the optical axis of the laser light of the first wavelength emitted from the first laser unit 1 and, in addition, the optical system is made up such that each of the laser lights of the first, second, and third wavelengths is received by the single photodetector 17. Moreover, the photodetector 17, having the same configuration as that of FIG. 2, is configured such that the main beam of the laser light of the second laser unit 3 and the main beam of the laser light of the first laser unit, the both optical axes of which laser lights are made to coincide with each other, can be received by a common main light-receiving area, and the first sub-light-receiving areas receiving the preceding and subsequent sub-beams of the laser light of the first laser unit and the second sub-light-receiving areas receiving the preceding and subsequent sub-beams of the laser light of the second laser unit 3, the both optical axes of which laser lights are made to coincide with each other, are disposed across the common main light-receiving area in a separate manner on the same straight line to achieve an efficient layout.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
a first laser unit including a first laser light source configured to emit a laser light of a first wavelength; and
a second laser unit including second and third laser light sources configured to respectively emit laser lights of second and third wavelengths different from the first wavelength and different from each other,
the first laser unit and the second laser unit being respectively disposed on a reflection surface side and a transmitting surface side of a first beam splitter, or, in reverse, on the transmitting surface side and the reflection surface side of the beam splitter,
laser lights of the first, second, and third wavelengths, which are selectively emitted from the respective laser light sources of the first laser unit and the second laser unit, being guided onto a common optical path through the first beam splitter and guided to the respective sorts of optical recording mediums compatible with the laser lights,
a diffraction grating being disposed on the common optical path, each of the laser lights of the first, second, and third wavelengths being divided by the diffraction grating into a main beam as well as preceding and subsequent sub-beams at the front and the back of the main beam, a second beam splitter being disposed on the upstream side of the diffraction grating, which is disposed on the common optical path, on a return path of each of the laser lights reflected and returned by the optical recording medium,
each of the laser lights of the first, second, and third wavelengths returned from the optical recording medium through the second beam splitter being branched from the optical path on which the diffraction grating disposed and being received by a photodetector, wherein
the diffraction grating is disposed between the first beam splitter and the second beam splitter.

2. An optical pickup apparatus comprising:
a first laser unit including a first laser light source configured to emit a laser light of a first wavelength; and
a second laser unit including second and third laser light sources configured to respectively emit laser lights of second and third wavelengths different from the first wavelength and different from each other,
the first laser unit and the second laser unit being respectively disposed on a reflection surface side and a transmitting surface side of a first beam splitter, or, in reverse, on the transmitting surface side and the reflection surface side of the beam splitter,
laser lights of the first, second, and third wavelengths, which are selectively emitted from the respective laser light sources of the first laser unit and the second laser unit, being guided onto a common optical path through the first beam splitter and guided to the respective sorts of optical recording mediums compatible with the laser lights,
a diffraction grating being disposed on the common optical path, each of the laser lights of the first, second, and third wavelengths being divided by the diffraction grating into a main beam as well as preceding and subsequent sub-beams at the front and the back of the main beam, a second beam splitter being disposed on the upstream side of the diffraction grating, which is disposed on the common optical path, on a return path of each of the laser lights reflected and returned by the optical recording medium,
each of the laser lights of the first, second, and third wavelengths returned from the optical recording medium through the second beam splitter being branched from the optical path on which the diffraction grating disposed and being received by a photodetector, wherein
an optical axis of one of the laser lights of the second and third wavelengths emitted from the second laser unit is made to coincide with an optical axis of the laser light of the first wavelength emitted from the first laser unit,
the main beam of the laser light of the second laser unit and the main beam of the laser light of the first laser unit, the both optical axes of which laser lights are made to coincide with each other, can be received by a common main light-receiving area, and
a first sub-light-receiving area configured to receive the preceding and subsequent sub-beams of the laser light of the first laser unit and a second sub-light-receiving area configured to receive the preceding and subsequent sub-beams of the laser light of the second laser unit, the both optical axes of which laser lights are made to coincide with each other, are disposed across the common main light-receiving area in a separate manner on the same straight line.

3. The optical pickup apparatus according to claim 2, wherein
a direction along which the common main light-receiving area and the first sub-light-receiving area are disposed, and
a direction along which a main light-receiving area and sub-light-receiving areas configured to receive the main beam and the sub-beams of the laser lights, respectively, are disposed, wherein an optical axis of the other of the laser lights of the second and third wavelengths emitted from the second laser unit is not made to coincide with the optical axis of the laser light of the first wavelength emitted from the first laser unit,
are made substantially in parallel with each other.

4. An optical pickup apparatus comprising:
a first laser unit including a first laser light source configured to emit a laser light of a first wavelength; and
a second laser unit including second and third laser light sources configured to respectively emit laser lights of second and third wavelengths different from the first wavelength and different from each other, the first laser unit and the second laser unit being respectively disposed on a reflection surface side and a transmitting surface side of a first beam splitter, or, in reverse, on the transmitting surface side and the reflection surface side of the beam splitter, laser lights of the first, second, and third wavelengths, which are selectively emitted from the respective laser light sources of the first laser unit and the second laser unit, being guided onto a common optical path through the first beam splitter and guided to the respective sorts of optical recording mediums compatible with the laser lights, a diffraction grating being disposed on the common optical path, each of the laser lights of the first, second, and third wavelengths being divided by the diffraction grating into a main beam as well as preceding and subsequent sub-beams at the front and the back of the main beam, a second beam splitter being disposed on the upstream side of the diffraction grating, which is disposed on the common optical path, on a return path of each of the laser lights reflected and returned by the optical recording medium, each of the laser lights of the first, second, and third wavelengths returned from the optical recording medium through the second beam splitter being branched from the optical path on which the diffraction grating disposed and being received by a photodetector, wherein a polarization direction of the laser light of the first wavelength emitted from the first laser unit, and a polarization direction of each of the laser lights of the second and third wavelengths emitted from the second laser unit, are set to the same on the common optical path, and wherein a quarter-wave plate is disposed on the common optical path.

5. The optical pickup apparatus according to claim 4, wherein the second beam splitter includes a polarization beam splitter, and wherein the quarter-wave plate is disposed on the downstream side of the second beam splitter on a outward path along which the laser light travels toward an optical recording medium.

* * * * *